United States Patent Office 3,323,685
Patented June 6, 1967

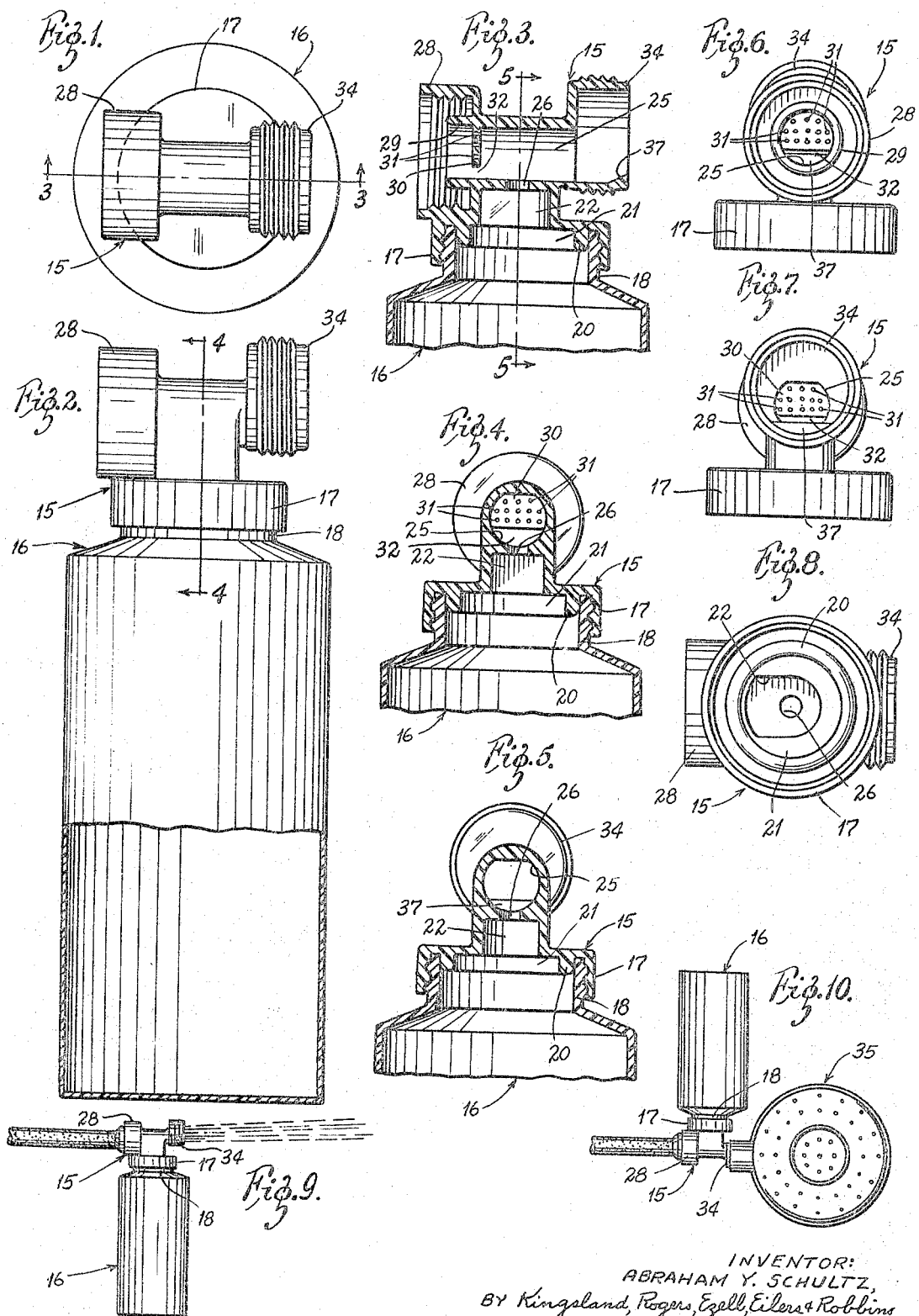

3,323,685
MIXING DEVICE FOR SPRAYS AND THE LIKE
Abraham Y. Schultz, University City, Mo., assignor to Schultz Shoe Co., Inc., St. Louis, Mo., a corporation of Missouri
Filed June 10, 1965, Ser. No. 462,839
9 Claims. (Cl. 222—193)

The present invention relates to a device using a bottle or other container for finely-divided, soluble, or liquid material, and an attachment or head therefor that can be connected to a hose or other such source of activating fluid under pressure. When the activating fluid is turned on, the finely-divided, soluble, or liquid material in the container or reservoir is mixed with the emitting stream of activating fluid and expelled from the device in the form of a spray or other suitable fluid pattern.

The attachment to be secured to the container includes a body portion that can be attached over an opening in the container as by a hollow, internally threaded flanged fitting. The body portion has a passage extending transversely of the opening in the container. There is a sizeable port through from the transverse passage to the hollow flange, to connect the former passage to the interior of the container.

The attachment has means at the upstream or inlet end of the transverse passage for attaching a hose or other similar source of activating fluid. The attachment has a baffle or equal means that causes the stream to spread out that deflects a part of the liquid downwardly into the container. The rest of the liquid moves under the baffle, as through an orifice, across the port, and out at the opposite end of the cross passage. There is no dip tube in this device. But by virtue of the fact that water, or other activating fluid tends to expand the cross-section of its stream downstream of the orifice, and to descend by gravity, the fluid rapidly fills the container. The fluid travels in the container in a circular path that agitates the finely-divided, soluble, or liquid material of low or high viscosity, that is within the container. The material is caused to rise to the top of the container and to flow outwardly through the port into the cross passage, where it is entrained with the stream of material that flows through the cross passage, and is expelled as part of a spray or emitting stream of material.

The mixer has a multitude of uses, including delivery of seeds or fertilizer, or both, to lawns, dispensing of soap or detergents, all of which normally include a liquid carrier. Other uses are the dispensing of powders, as insect repellant dust, the dispensing of dry seeds, or other finely-divided materials. Additional uses of these and related kinds will be evident from the description hereafter.

It is an object of the invention to provide a dispensing apparatus of the foregoing type. It is a particular object of the invention to provide one of this type which acts without a dip tube and without small openings that can become clogged by relatively viscous or finely-divided insoluble material. Stated somewhat differently, it is an object of the invention to provide a device of this kind which has relatively large openings only through which the viscous or finely-divided solid material must pass, without requiring the same to go through any small holes or long and small passages.

Another object of the invention is to provide a device of this kind that causes the stream of liquid containing the material to be dispensed to incorporate not merely that material to be dispensed but also the liquid that flows directly across the transverse flow passage without entering into the container.

Other objects include the provision of a device of this kind which can be operated in upright position for relatively slow feed of the material in the container or in inverted position for relatively fast delivery of the material from the container. Also an object is to provide a device of this kind that can be used with sprinklers, at least where the material is liquid, so that it can flow out holes through the sprinkler.

Other objects will appear from the description to follow.

In the drawings:
FIGURE 1 is a top plan view of the apparatus;
FIGURE 2 is a side elevation, the container being shown partly in section;
FIGURE 3 is a partial section of the device taken on the line 3—3 of FIGURE 1, this view being on the axis of the transverse passage through the device;
FIGURE 4 is a transverse partial sectional view taken on the line 4—4 of FIGURE 2 looking upstream;
FIGURE 5 is a view similar to FIGURE 4, being a transverse section looking downstream in the direction opposite that of FIGURE 4;
FIGURE 6 is an elevation of the attachment of head of the dispenser looking downstream into the inlet, taken from the left of FIGURES 1 and 2;
FIGURE 7 is an elevation of the head looking upstream into the inlet, taken from the right of FIGURES 1 and 2;
FIGURE 8 is a bottom view of the head;
FIGURE 9 is a view of the device attached to a hose and in operation; and
FIGURE 10 is a view showing the device connected to a sprinkler.

Essentially the device includes two parts, namely, a head 15 and a container 16 here shown in the form of a polyethylene bottle. The head itself preferably is of molded plastic material so that it is rust-proof and non-breakable. Desirably it may be somewhat flexible. It may also be made of metal, ceramic or other material.

The head 15 has a lower flanged skirt portion 17, with internal threads adapted to engage corresponding external threads on the neck 18 of the bottle 16. The head also has a depending internal flange 20 adapted to fit down into the neck 18 of the bottle to reinforce the same and keep the bottle neck from collapsing when the head 15 is threaded onto the bottle.

The interior of the flange portion 20 provides a recess 21 of cylindrical shape and above this there is a recess 22 of somewhat elongated shape as illustrated in FIGURE 8. These recesses form an opening communicating with the interior of the container 16.

Above the recess 22 the body has a transverse passage generally indicated at 25. The passage 25 is open at its opposite ends. It communicates with the passage 22 through a hole 26. This hold should be preferably through a relatively thin wall and should be relatively large. Assuming that the device is for use on a bottle of approximately two inches diameter, the hole 26, as illustrated, can be about ⅛"–3/16" in diameter for materials normally to be dispensed for use in feeding and spraying lawns and gardens with fertilizer or seeding them with grass seed. An opening of this size will not be clogged by the smaller seed.

The left or inlet end of the passage 25 has an enlarged connector 28 formed thereon so that it can be screwed onto the externally threaded end fitting of a hose. The passage 25 is provided with a flange 29 that can fit into the hose and form a seal against the fitting to provide a better control of the stream of water entering the head 15.

Inside the passage 25, spaced about 3/16 to ¼ inch inwardly from the inlet end, there is a baffle 30 having perforations 31 therein. This baffle extends only part of the way down from the top, between the entrance of the passage 25 and the leading portion of the hole 26. This leaves a free segmental orifice or passage 31 below the baffle 30.

The downstream end of the passage 25 terminates in an enlarged externally-threaded outlet flange 34. It can be threaded so that it can be applied to a conventional garden hose spray 35 or the like, as illustrated in FIGURE 10, or to irrigating systems, such as a hose pipe for transmission to a more distant point of delivery. At the bottom of the passage 25 at its outlet end there is a ledge or lip 37 sloping upwardly in the downstream direction as illustrated in FIGURE 3.

Operation and use

This dispenser may be used to dispense fertilizers or seeds as indicated or other soluble or insoluble materials. If the solid is insoluble, it must be finely divided. The liquids may be of low or high viscosity but must, of course, not be so thick that they cannot be stirred up by the incoming water or other activating liquid, unless the mass is soluble.

To illustrate its use, the device may be assumed to be connected to a garden hose as shown in FIGURE 9 and held in the upright position, with the container 16 partly or wholly filled with grass seeds and soluble fertilizer. Preferably the container 16 is of a size to be grasped in the hand, since this makes for convenient use in an ordinary garden or lawn. However, this is not intended to be a limitation, as the device may be proportioned up to very large sizes.

When the water is turned on, the stream enters the cross passage 25 within the flange 29. It first strikes the baffle 30. Part of it can pass directly through the holes 31 and the rest flows through the free orifice 32. The stream tends to enlarge after it has passed the orifice 32 in the baffle. This causes part of the stream to move downwardly and forwardly through the hole 26, and to flow under the characteristic expanding stream pressure, as well as under gravity, into the container 16. It is thought to move in the container 16 in something of a circular passage, downwardly and back upwardly causing it to stir up the contents of the bottle and, as and after the bottle fills with water, to emerge through the opening 26 to mingle with the stream in the passage 25 and to be expelled therewith through the outlet portion 34. The high velocity caused by the orifice 26 increases the suction drawing the mixture, solution, or suspension up through the opening 26. Since the material within the container is vigorously agitated and caused to circulate upwardly and out with the stream of liquid, it is not necessary to have a dip tube and, indeed, the opening 26 can be maintained large enough to avoid and minimize problem of clogging.

As the stream emits from the downstream end of the passage 25, its lower portion is caused to strike the lip or ledge 37 and be deflected upwardly. This assures that any excessive concentration of the material from the container 16 that is present in the lower part of the stream within the passage 25 is deflected upwardly, and also this causes the stream to spread and emit in a wide pattern or spray.

A prime function of the baffle is to cause the stream to be constricted and then to spread, near the hole 26. The stream of activating fluid must flow into the hole so as to fill the container 16 and to roil the mixture of activating fluid and the product from the container, causing the same to rise from the hole into the cross passage 25. This baffle, therefore, must perform the function of deflecting fluid into the hole, and yet also of producing the pressure difference that causes the mixture to be entrained into the stream flowing through the cross passage. Variant means may be used to cause the activating fluid to perform this way. As the baffle means is repositioned downstream, it increases the flow into the container 16, and the proportion of the product of that container to the volume of activating fluid. The baffle means can be moved downstream until it overhangs the hole 26, whereat it gives a maximum flow into the container 16 and maximum "richness" of the mixture.

This activating fluid is here described as being water. Of course, other liquids may be used, and air or gases may likewise be used with appropriate adjustments of the proportions of the components of the device. The materials to be dispensed may be any soluble material that can be dissolved by the activating fluid, or a finely-divided material of sizes not too great to be stirred up by the activating fluid within the container, raised to the top thereof, and drawn out into the stream within the passage 25. As noted, grass seed typically can be dispensed in this type of device. The material may be viscous, provided it is not so viscous that it is resistant to being stirred up by the stream of liquid. It can be powdered material and, where it is desired to spray out powder, this can be done by using air or another gas as the activating fluid.

The size of the dispenser can be varied widely depending upon the materials to be dispensed and the nature of the use. Quite large particles can be dispensed where the device is made large and sufficient velocity can be obtained for the activating fluid.

As the container 16 is inverted from upright toward fully inverted position, gravity can add more and more to the rate at which the material is delivered from the container 16 into the stream within the passage 25. When the device is inverted, normally the maximum dispensing occurs, since the material tends to flow out into the stream within the passage 25 and to be drawn out with greater ease. An extra burst of material can be dispensed by compressing the sides of the container 16, when the container is made of some material such as polyethylene.

Liquid materials can be dispensed directly into a spray or sprinkler device such as shown at 35 in FIGURE 10. The sprinkler or irrigation device should not offer too great a resistance to flow of the activating fluid charged with the material to be dispensed, unless the members 15 and 16 are made of sufficient strength to withstand the pressures created.

Various changes and modifications may be made within the process of this invention as will be readily apparent to those skilled in the art. Such changes and modifications are within the scope and teaching of this invention as defined by the claims appended hereto.

What is claimed is:

1. In a dispenser adapted to transmit an activating fluid and to cause mixture therewith of particulate or liquid or soluble materials: a container having an opening in its upper end; a head adapted to be secured in sealing relationship to the top of the container in which the material to be added is contained, the head having means to secure it to the container about the opening in the latter, the head having means providing a through-passage extending transversely to and above the opening, and having an inlet upstream end and out an outlet downstream end, a hole through a median point in the bottom wall of the through-passage communicating the same with the opening in the container in such wise that fluid passing lengthwise of the through-passage will flow across the hole, a baffle depending from the top wall of the through-passage between the inlet and the hole, the baffle providing an opening adjacent its lower end to cause activating fluid to be confined and to flow at increased velocity across the opening, thereby to cause a suction through the hole being large enough so that the suction is enabled to draw material from the container through the hole, and large enough to admit some of the activating fluid into the container.

2. In a mixing device of the kind described: a container for material to be mixed into a fluid stream, an opening into the container; a head over the opening, attached in sealing relation over the opening and having a transverse passageway extending in a direction across the container opening and adapted to be connected to a source of fluid under pressure; a port at a mid-position along the passageway connecting the same with the opening; a baffle means projecting into the passageway providing a restriction to constrict the passageway and cause an incoming stream of fluid to increase in velocity and to expand downstream thereof, the baffle means being located at least partially upstream of the port and in an area of the passageway where the stream is deflecting and the velocity is high, so that the fluid can enter the container through the port, and will be sucked, with material from the container, back through the port into the stream flowing through the passageway.

3. In the mixing device of claim 2: the baffle means extending downwardly from the top of the passageway and terminating short of the bottom thereof, thus providing the orifice adjacent the bottom; the port also connecting through the bottom and in alignment with the orifice, whereby fluid emitting from the orifice can pass over the port.

4. In the mixing device of claim 3, the baffle having port means through it above the orifice smaller than the orifice.

5. In the mixing device of claim 2: the head having a flanged inlet for the passageway, internally threaded, and having a sleeve-like axial flange concentric with but smaller than the inlet to fit into the entrance of a tube attached to the threaded flanged inlet.

6. In the mixing device of claim 2, the wall through which the port passes being a relatively thin wall.

7. In a head for a mixing device: a lower vertical flanged portion having means to secure and to seal the head over an opening in a container; a large upwardly extending recess in the flanged portion; a transverse passageway in the head, extending from side to side of the head cross-wise of and over the recess; a port connecting the end of the recess into the passageway between the ends thereof; and baffle means in the passageway upstream of the downstream edge of the port, providing an orifice for delivering an expanding stream of fluid across the port, the passageway being otherwise imperforate upstream of the baffle means, and the port being large enough to provide ingress and egress of liquid between the recess and the passageway.

8. In the head of claim 7, the baffle having perforations through it above the orifice.

9. In the head of claim 7, the baffle providing the orifice adjacent the lower wall of the passageway.

References Cited

UNITED STATES PATENTS

| | | | |
|---|---|---|---|
| 1,769,266 | 7/1930 | Lusier | 239—317 |
| 2,536,361 | 1/1951 | Flanders | 239—317 X |
| 2,704,206 | 3/1955 | Crook | 222—193 X |
| 3,091,402 | 5/1963 | Palmer | 239—317 X |
| 3,260,464 | 7/1966 | Harant | 239—318 |

FOREIGN PATENTS 888,387    1/1962    Great Britain.

ROBERT B. REEVES, *Primary Examiner.*

STANLEY H. TOLLBERG, *Examiner.*